United States Patent
Geltinger et al.

(10) Patent No.: US 7,625,004 B2
(45) Date of Patent: Dec. 1, 2009

(54) MOTOR VEHICLE TRIM ELEMENT HAVING WEAKENED AREAS AND METHODS FOR THE MANUFACTURE THEREOF

(75) Inventors: Hubert Geltinger, Vilsbiburg (DE); Roland Friedberger, Boiling Springs, SC (US); Henry Müller, Landshut (DE)

(73) Assignee: Lisa Draelmaier GmbH, Vilsbiburg (DE)

( * ) Notice: Subject to any disclaimer, the term of this patent is extended or adjusted under 35 U.S.C. 154(b) by 268 days.

(21) Appl. No.: 11/385,026

(22) Filed: Mar. 20, 2006

(65) Prior Publication Data

US 2006/0220354 A1   Oct. 5, 2006

(30) Foreign Application Priority Data

Mar. 23, 2005   (DE) .............. 10 2005 013 477

(51) Int. Cl.
*B60R 21/215*   (2006.01)
(52) U.S. Cl. .................... 280/728.3; 280/732
(58) Field of Classification Search .............. 280/728.3, 280/732
See application file for complete search history.

(56) References Cited

U.S. PATENT DOCUMENTS

| | | | |
|---|---|---|---|
| 5,231,253 A | | 7/1993 | Breed et al. |
| 5,308,112 A | | 5/1994 | Hill et al. |
| 5,316,822 A | * | 5/1994 | Nishijima et al. ........... 428/138 |
| 5,443,777 A | | 8/1995 | Mills |
| 5,488,092 A | | 1/1996 | Kausch et al. |
| 5,698,283 A | * | 12/1997 | Yamasaki et al. ............. 428/43 |
| 5,839,752 A | * | 11/1998 | Yamasaki et al. ........ 280/728.3 |
| 5,868,420 A | | 2/1999 | Higashiura et al. |
| 5,979,931 A | * | 11/1999 | Totani et al. ............. 280/728.3 |
| 5,997,030 A | | 12/1999 | Hannert et al. |
| 6,022,623 A | | 2/2000 | Clerici |
| 6,042,139 A | * | 3/2000 | Knox ....................... 280/728.3 |
| 6,109,645 A | * | 8/2000 | Totani et al. ............. 280/728.3 |
| 6,113,131 A | | 9/2000 | Uehara et al. |
| 6,199,897 B1 | | 3/2001 | Kreile |
| 6,276,712 B1 | | 8/2001 | Welch et al. |

(Continued)

FOREIGN PATENT DOCUMENTS

DE   19516230 C2   11/1996

(Continued)

OTHER PUBLICATIONS

European Search Report EP06011961, dated Oct. 10, 2006.

(Continued)

*Primary Examiner*—Paul N. Dickson
*Assistant Examiner*—Drew J. Brown
(74) *Attorney, Agent, or Firm*—Wolf, Greenfield & Sacks, P.C.

(57) ABSTRACT

A motor vehicle trim element having weakened areas for an airbag deployment opening is provided. The layered construction of the trim element includes a carrier layer, a spacer layer laminated thereto and a decorative layer. A weakened area of the decorative layer is not visible from the outside. An additional layer of material, made of, for example, a plastic film, is located between the spacer layer and the decorative layer to reduce the likelihood of the weakened area becoming visible from the outside, even under thermal and/or mechanical stress. The additional layer of material may also include a weakened area.

17 Claims, 1 Drawing Sheet

U.S. PATENT DOCUMENTS

| | | |
|---|---|---|
| 6,325,410 B1 | 12/2001 | Eyrainer |
| 6,357,788 B2 | 3/2002 | Kreile |
| 6,402,189 B1 | 6/2002 | Gray et al. |
| 6,753,057 B1 | 6/2004 | Gardner |
| 6,764,633 B2 | 7/2004 | Takahashi et al. |
| 7,139,650 B2 | 11/2006 | Lubischer |
| 7,384,063 B2 | 6/2008 | Riester et al. |
| 7,458,604 B2 | 12/2008 | Hier et al. |
| 7,490,851 B2 | 2/2009 | Riester et al. |
| 2002/0060447 A1 | 5/2002 | Acker et al. |
| 2002/0164528 A1 | 11/2002 | Sunagawa et al. |
| 2003/0011174 A1 | 1/2003 | Merrifield et al. |
| 2004/0155441 A1 | 8/2004 | Hofmann |
| 2004/0164531 A1 | 8/2004 | Riha et al. |
| 2004/0199319 A1 | 10/2004 | Lubischer |
| 2005/0040629 A1 | 2/2005 | Chausset |
| 2005/0052005 A1 | 3/2005 | Lunt et al. |
| 2005/0215143 A1* | 9/2005 | Hehn et al. .......... 442/43 |
| 2006/0082106 A1* | 4/2006 | Hier et al. .......... 280/728.3 |

FOREIGN PATENT DOCUMENTS

| | | |
|---|---|---|
| DE | 19648138 A1 | 5/1998 |
| DE | 198 19 537 A1 | 11/1998 |
| DE | 198 00 815 C1 | 2/1999 |
| DE | 19944371 A1 | 3/2001 |
| DE | 101 17 938 A1 | 4/2001 |
| DE | 101 04 036 A1 | 8/2001 |
| DE | 101 35 224 A1 | 7/2002 |
| DE | 102 29 962 A1 | 1/2004 |
| DE | 10241715 A1 | 3/2004 |
| DE | 103 15 662 A1 | 10/2004 |
| DE | 103 61 581 A1 | 7/2005 |
| DE | 102004014942 A1 | 10/2005 |
| EP | 0827867 A1 | 7/1997 |
| EP | 0916555 A | 5/1999 |
| EP | 1 445 156 A1 | 11/2003 |
| FR | 2 721 876 A1 | 1/1996 |
| FR | 2792271 A | 10/2000 |
| FR | 2799700 A1 | 4/2001 |
| JP | 05162598 A | 6/1993 |
| JP | 0827409 | 1/1996 |
| WO | WO 97/03866 A | 2/1997 |
| WO | WO 2004/087473 A | 10/2004 |

OTHER PUBLICATIONS

European Search Report EP06004409, dated May 3, 2006.
European Search Report EP06004408, dated May 2, 2006.
European Search Report EP06004407, dated Jun. 1, 2006.

* cited by examiner

MOTOR VEHICLE TRIM ELEMENT HAVING WEAKENED AREAS AND METHODS FOR THE MANUFACTURE THEREOF

BACKGROUND

1. Field

Aspects of the invention relate to motor vehicle trim elements and in particular to trim elements cooperating with airbags.

2. Discussion of Related Art

DE 101 35 224 A1 discloses an arrangement for the interior equipment of a motor vehicle and a method for the manufacture thereof. An interior trim element for an airbag deployment opening is provided with weakened areas. The trim element comprises a layered arrangement of a carrier layer, a spacer layer laminated thereto and a decorative layer on the side of the spacer layer facing away from the carrier layer. The spacer layer is made, for example, of polyurethane foam. To form the weakened areas in these layers, material is removed in the carrier layer and the spacer layer along weakened lines in the form of a tear perforation. Material is also removed from the decorative layer in an area along the weakened lines. Material is removed in the decorative layer from the inside surface such that this removal area is not visible from the outside. The material may be removed or displaced by cutting or milling into it.

SUMMARY

In one illustrative embodiment, a motor vehicle trim element having weakened areas for an airbag deployment opening is provided. The trim element includes a carrier layer, a spacer layer laminated to the carrier layer and a decorative layer on the side of the spacer layer facing away from the carrier layer. At specific locations within their area, material has been removed or displaced so as to selectively provide weakened areas as predetermined breaking points. These points where material has been removed or displaced terminate in front of the outer surface of the decorative layer and are not, therefore, visible from the outside. Between inner surface of the decorative layer and the adjacent surface of the spacer layer, in each case in contact with the surface of both layers, a thin additional layer of material which has at least one area where material has been removed or one area where material has been displaced in the same weakened location is disposed.

In another illustrative embodiment, a method for the manufacture of a motor vehicle trim element is provided. The method includes facing a spacer layer with an additional layer of material to form a pre-laminate, laminating the pre-laminate onto a carrier layer, weakening the pre-laminate to form a weakened area, and laminating a decorative layer onto the pre-laminate.

In yet another illustrative embodiment, a motor vehicle trim element is provided. The trim element is adapted to cooperate with an airbag. The trim element includes a carrier layer, a spacer layer attached to the carrier layer, and a decorative layer disposed on a side of the spacer layer facing away from the carrier layer. An intermediate layer is disposed between the spacer layer and the decorative layer.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which.

DETAILED DESCRIPTION

Figure 1:
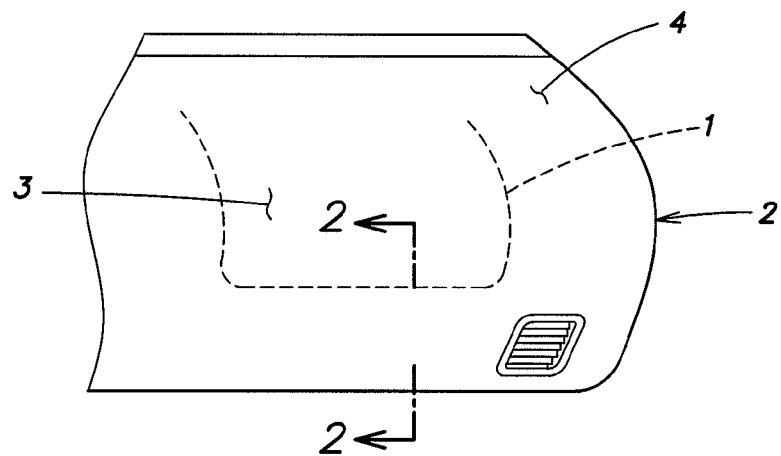
FIG. 1 shows a perspective view of part of an instrument panel of a motor vehicle.

Airbags are accommodated by trim elements wherein the trim elements allow the airbag to deploy in an emergency. Weakened areas in the trim piece readily allow deployment. Unfortunately, even if the weakened areas are initially not visible from the outside, that is, for example, from the perspective of the vehicle passenger compartment, the weakened area may nevertheless become visible over time. Thus, in some instances, it may be desirable to prevent or otherwise reduce the likelihood that the weakened areas become visible from the outside.

In one embodiment, the motor vehicle trim element has a carrier layer, a spacer layer attached thereto and a decorative layer disposed on the side of the spacer layer facing away from the carrier layer. An additional layer of material may be disposed between the decorative layer and the spacer layer. This additional layer cooperates in a manner to reduce the likelihood that the weakened areas become visible on the outside of the decorative layer, which might otherwise happen over time and/or as a result of thermal and/or mechanical stresses. For example, the weakened area of the decorative layer of the prior art might become visible from the outside as a result of the material indenting or sinking at the weakened area.

In one embodiment, the additional layer of material also includes a weakened area, thereby enhancing airbag deployment. In one embodiment, the additional layer of material has at least one area where material has been removed and one area where material has been displaced at the same weakened location.

In one embodiment, the additional layer of material is in contact with the surface of the spacer layer and in contact with the surface of the decorative layer. It should be appreciated that the present invention is not limited to the additional layer of material being disposed only between the decorative layer and the spacer layer. For example, in one embodiment, a further additional layer of material is disposed between the spacer layer and the carrier layer. In another embodiment, instead of locating the additional layer of material between the decorative layer and the spacer layer, the additional layer of material is disposed between the spacer layer and the carrier layer.

In one embodiment, the additional layer of material is thin relative to the spacer layer or the decorative layer or both. It should be appreciated that the additional layer of material, the spacer layer and the decorative layer may be formed of any suitable material, as the present invention is not limited in this regard. The additional layer of material, in one embodiment, may be a plastic film. The spacer layer may be a foam layer or a knit spacer fabric or a fiber mat. The decorative layer can be of a different material, for example leather or plastic.

In one embodiment, material is removed from the additional layer of material in the form of a perforation, and, in one embodiment, a perforation line (e.g., formed as a slot). This results in ligaments of material remaining present, which may more effectively reduce movement of the decorative layer under thermal or mechanical influences. In one embodiment, the ratio of the length of the slots to the length of the ligaments in the linear direction is in a range from approximately 6:1 to approximately 15:1. In one embodiment, the ratio is approximately 10:1. Other suitable ratios may be employed, as the present invention is not limited in this regard.

In one embodiment, the area where material has been removed from the spacer layer can also be a perforation line, which may follow the perforation line of the additional layer of material. In this manner, both perforation lines can be congruent. The perforation lines can run differently, for example in a straight line or wavy or zigzag shape, as the present invention is not limited in this respect. In one embodiment, the weakened areas in the decorative layer and in the additional layer of material are disposed offset to one another.

For adequate adhesion between the additional layer of material and the decorative layer, the additional layer of material disposed on the inside of the decorative layer may be surface treated, for example by washing/abrading with a detergent or solvent, or by blasting, plasma treating, applying fluorination or mechanical roughening. Other suitable surface preparations may be employed, as the present invention is not limited in this respect.

In one embodiment, the area between the perforations (e.g. the ligaments or other area) may have a reduced wall thickness as compared to the remainder of the additional layer of material. In the decorative layer, this reduced wall thickness can range between approximately 0.2 mm and approximately 0.8 mm. In one embodiment, the wall thickness ranges between approximately 0.4 mm and approximately 0.8 mm. In what is known as the initial area (i.e., where the area first starts), the residual wall thickness of the decorative layer at the weakened points can be in a range between approximately 0.15 mm to approximately 0.4 mm and in the remaining area, the wall thickness is in a range between approximately 0.2 mm to approximately 0.8 mm and, in one embodiment, between approximately 0.4 mm and approximately 0.8 mm. Other suitable dimensions may be employed, as the present invention is not limited in this respect.

Turning now to the figures, and in particular to the schematic representation of FIG. 1, a part of the instrument panel 2 of a motor vehicle trim element 4 of a motor vehicle will now be discussed. A location where an airbag (not shown) is located behind the instrument panel, or where an airbag deployment opening 3 is located, is identified as a dotted line. The airbag development opening includes a weakening line 1 (not visible from the outside of the trim panels, that is from the perspective of the interior of the vehicle compartment).

The motor vehicle trim element 4 may be formed as a layered construction and may include a carrier layer 5, a spacer layer 6, an additional layer of material 7 and a decorative layer 8 in order from the interior of the vehicle door toward the passenger compartment. Spacer layer 6 is shown here as a foam layer but can also be a knit spacer fabric. Additional layer of material 7 is a plastic film, although the present invention is not limited in this respect. Decorative layer 8 may be leather, a web-like material, or any other suitable surface material. In one embodiment, a further additional layer of material 7' is disposed between the spacer layer 6 and the carrier layer 5.

In one embodiment in a weakened area 9 along weakening line 1, a milled out section 10 through carrier layer 5 and part of foam layer 6 is provided. A perforation line 11a in at least part of foam layer 6 and a perforation line 11b in plastic film 7 may also be provided. A weakened area 12 in decorative layer 8 (shown here in a wavy shape, although any suitable shape may be employed, as mentioned above) ends at a distance "d" from the outer surface 13 of decorative layer 8. In one embodiment, the dimension "d" is between approximately 0.2 mm and approximately 0.8 mm. In what is known as the initial area, i.e., where the area first starts, this residual wall thickness is between approximately 0.15 mm and approximately 0.4 mm, and in the remaining area between approximately 0.2 mm and approximately 0.8 mm. In this manner, the weakened area is not visible from the outside.

Figure 2:
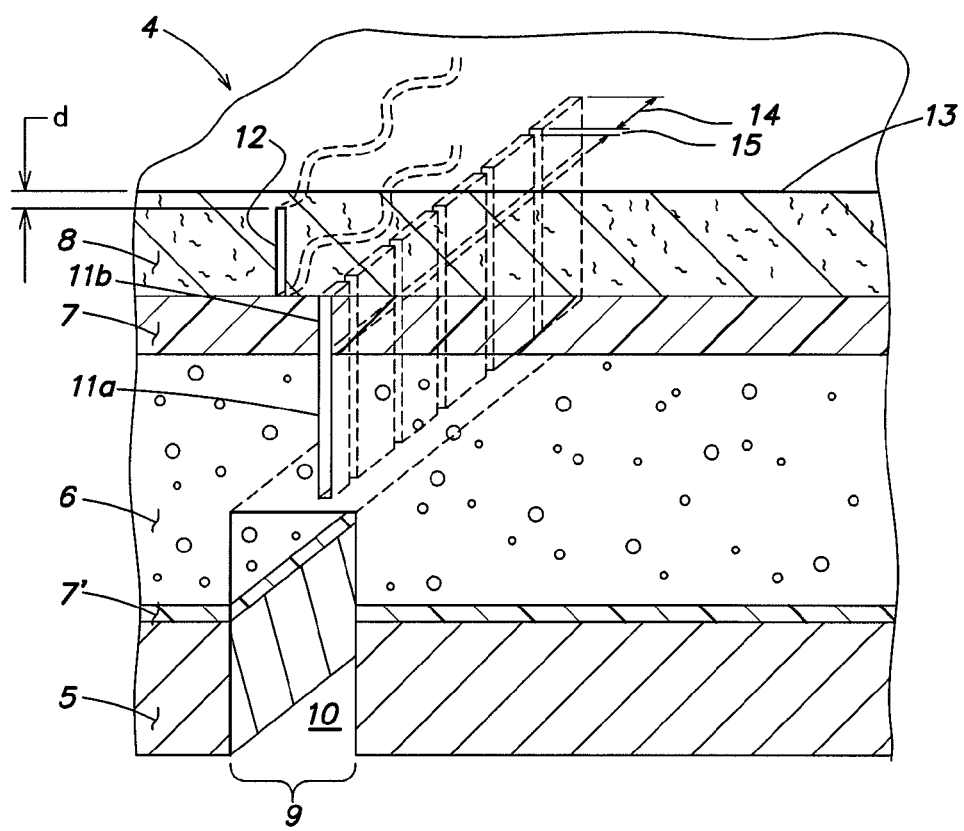
FIG. 2 shows, in an enlarged diagram, a sectional view along the line A-A of FIG. 1 through the layered construction of a motor vehicle trim element with weakened areas for an airbag deployment opening.

In the diagram, weakened area 12 is a continuous cutting line or an area from which material has been removed as a cutting line. However, it should be appreciated that the present invention is not limited in this regard, as the weakened area 12 can also be a perforation. Perforation line 11b includes slots 14 and ligaments 15. In one embodiment, the length ratio of slots 14 to ligaments 15 is 10:1. In another embodiment, the ratio can range between approximately 15:1 and approximately 6:1. As can be seen from FIG. 2, weakening lines 11a, b and 12 are offset to one another. However, the present invention is not limited in this respect. Ligaments 15 remaining in the perforation can additionally be weakened to a defined residual wall thickness. The initial area can also be a continuous cut or a continuous perforation. This can be subsequently covered by a badge, for example. The initial area can also be a sewn area, which can likewise be subsequently covered by a badge, for example. The decorative layer can be formed of leather, imitation leather, leather-type materials or what are known as web materials with thermoplastic or duromer top layers, as the present invention is not limited in this regard.

The motor vehicle trim element with weakened areas for an airbag deployment opening can be formed in any suitable manner. In one embodiment, the process involves the following. The spacer layer 6 is faced on at least one side with the additional thin layer or film of material 7, thereby forming a pre-laminate. Spacer layer may be a foam layer or a knit spacer fabric. This pre-laminate is laminated onto the carrier layer 5, with the at least one additional layer of material 7 facing towards the visible side (upwards in FIG. 2). Alternatively, this pre-laminate may be formed by foaming the carrier layer 5 and layer 7. The decorative layer 8, which may be formed of leather or as a web material (formed of PU and/or PVC) is then laminated onto the panel thus prepared. In one embodiment, a weakening 12 has already been introduced previously in the leather or the web material on the inner surface facing away from the visible side of the decorative surface.

An alternative process for forming the trim element will now be described. In this embodiment, the spacer layer 6, which may be a foam layer or knit spacer fabric, is faced on at least one side with the additional thin layer of material 7. A weakened area, which in this embodiment, extends through the entire spacer layer, is introduced into this pre-laminate. The weakening can be a continuous cut of any shape and/or outline or, in one embodiment, a perforating cut likewise of any shape and/or outline. If a perforation is provided, the ligaments remaining in the film during perforation may optionally be weakened to a defined residual wall thickness. In one embodiment, decorative layer 8 is then laminated onto the spacer layer thus prepared on the inner surface facing away from the decorative surface's visible side. A weakening has already been introduced previously in the decorative layer. The resulting laminate formed of spacer layer 6, film 7 and decorative layer 8 is subsequently laminated onto carrier 5.

The weakening can be created with any suitable device, as the present invention is not limited in this respect. For example, the weakening may be formed by means of knives (dragging cut, oscillating knife), laser, punch or milling cutter. In the case of lasering, the weakening can also be carried out from the reverse side. The weakening can be a continuous cut of any shape and/or outline or a perforating cut likewise of any shape and/or outline. The weakening extends up to the carrier layer.

In one embodiment, the carrier layer can be milled out from the reverse side in the region of the weakened areas. This milling out can generally run along a line, which represents a perforation line, so that ligaments are left. By means of this milling, it is possible to form a flap which hinges up on airbag deployment and allows the airbag to pass through. The additional layer of material can be pre-treated for a better bond between the additional layer of material and the decorative layer.

As discussed above, film 7, either by itself or in conjunction with the weakening, reduces the likelihood that the decorative layer 8 will become displaced during thermal and/or mechanical stress and reduces the likelihood that the the weakening line becomes visible when viewed from the perspective of the interior passenger compartment. Thus, in one embodiment, it is not only possible to dispense with the airbag seam, but it is also possible to provide and improved visual appearance throughout the life of the trim element.

In one embodiment, an instrument panel having carrier 5, spacer layer 6, film 7 and decorative layer 8 can be weakened in the airbag area in the following manner. In one embodiment, film 7 is weakened and back-foamed with foam layer 6 and carrier 5 may then be milled open from the reverse side to create opening 10. In an alternative embodiment, film 7 can be back-foamed and then carrier 5 can be milled open from the reverse side. In yet another alternative embodiment, foaming of carrier 5 and film 7 and subsequent weakening of the airbag area in the laminate up to a residual wall thickness "d", e.g. by lasering, may occur.

In one embodiment, to realize an invisible tear line in the decorative layer, the following process may be performed. A relatively larger weakening of the laminated construction of film 7, foam layer 6 and carrier 5 than in previously described embodiments is provided. An additional weakening may also be provided. For example, the laminated compound is perforated or cut completely from the visible side. This cut can be made with a knife—by means of a dragging cut or with the help of an oscillating knife—with a milling cutter, punch or laser. The cut may weaken only the film or the film and foam layer. In one embodiment, the film surface is pre-treated (depending on the material and manufacturing process) so that adequate adhesion between this film and the additional decorative layer can be obtained. This surface treatment may be realized by, washing and/or abrading with an appropriate detergent or solvent, blasting with an appropriate blasting agent, plasma treating, fluorination, and/or mechanical roughening.

The carrier layer 5, foam layer 6, film 7 and decorative layer 8 may have any suitable thickness, as the present invention is not limited in this regard. In one embodiment, carrier layer 5 has a thickness in a range between approximately 1.5 mm and approximately 5 mm. In one embodiment, foam layer 6 has a thickness in a range between approximately 1 mm and approximately 15 mm. In one embodiment, film 7 has a thickness in a range between approximately 0.2 mm and approximately 2.0 mm. In one embodiment, decorative layer 8 has a thickness in a range between approximately 0.6 mm and approximately 2.0 mm.

It should be appreciated that various combinations of the above-described embodiments can be employed together, but several aspects of the invention are not limited in this respect. Therefore, although the specific embodiments disclosed in the figures and described in detail employ particular combinations of features, it should be appreciated that the present invention is not limited in this respect, as the various aspects of the present invention can be employed separately, or in different combinations. Thus, the particular embodiments described in detail are provided for illustrative purposes only.

It should also be appreciated that a variety of features employed in the art of vehicle manufacture may be used in combination with or to modify the above-described features and embodiments.

The foregoing written specification is to be considered to be sufficient to enable one skilled in the art to practice the invention. While the best mode for carrying out the invention has been described in detail, those skilled in the art to which this invention relates will recognize various alternative embodiments including those mentioned above as defined by the following claims. The examples disclosed herein are not to be construed as limiting of the invention, as they are intended merely as illustrative of particular embodiments of the invention as enabled herein. Therefore, systems and methods that are functionally equivalent to those described herein are within the spirit and scope of the claims appended hereto. Indeed, various modifications of the invention in addition to those shown and described herein will become apparent to those skilled in the art from the foregoing description and fall within the scope of the appended claims.

What is claimed is:

1. A motor vehicle trim element having weakened areas for an airbag deployment opening, the trim element comprising:
   a carrier layer;
   a spacer layer laminated to the carrier layer; and
   a decorative layer on the side of the spacer layer facing away from the carrier layer;
   wherein each of the carrier layer, the spacer layer, and the decorative layer comprises a weakened area whereby at specific locations of each layer, material has been removed or displaced so as to selectively provide the weakened areas as predetermined breaking points, whereby these points where material has been removed or displaced terminate in front of the outer surface of the decorative layer and are not, therefore, visible from the outside;
   wherein between the inner surface of the decorative layer and the adjacent surface of the spacer layer, in each case in contact with the surface of both layers, is disposed a thin additional layer of material which has at least one area where material has been removed or one area where material has been displaced in the same weakened location, the additional layer of material, the additional layer of material being a plastic film that is thinner than the spacer layer and the decorative layer;
   wherein the weakened area in the decorative layer and the weakened area in the additional layer of material are disposed offset to one another.

2. The motor vehicle trim element according to claim 1, wherein the spacer layer comprises at least one of a foam layer, a knit spacer fabric, and a fiber mat.

3. The motor vehicle trim element according to claim 1, wherein the area where material has been removed from the additional layer of material is formed by a perforation along a perforation line.

4. The motor vehicle trim element according to claim 3, wherein the area where material has been removed from the spacer layer comprises a second perforation line that follows the perforation line of the additional layer of material.

5. The motor vehicle trim element according to claim 4, wherein the two perforation lines are congruent.

6. The motor vehicle trim element according to claim 3, wherein the perforation line is formed alternately by slots and material ligaments and the length ratio of the slots to the material ligaments is approximately 10:1.

7. The motor vehicle trim element according to claim 6, wherein the material ligaments have a reduced wall thickness.

8. The motor vehicle trim element according to claim 3, wherein the perforation line runs in one of a straight line, a wavy line and a zigzag line.

9. The motor vehicle trim element according to claim 1, wherein a further additional layer of material is disposed between the spacer layer and the carrier layer.

10. The motor vehicle trim element according to claim 1, wherein the additional layer of material disposed on the inside of the decorative layer is surface treated.

11. The motor vehicle trim element according to claim 10, wherein the surface treatment comprises at least one of washing, abrading, blasting, plasma treating, fluorination treating and mechanical roughening.

12. The motor vehicle trim element according to claim 1, wherein a wall thickness of the decorative layer at the weakened area is in a range between approximately 0.2 mm and approximately 0.8 mm.

13. The motor vehicle trim element according to claim 1, wherein a wall thickness of the decorative layer in an initial area of the weakened area is in a range between approximately 0.15 mm and 0.4 mm and, in the remaining area, the wall thickness is in a range between approximately 0.2 mm and 0.8 mm.

14. The motor vehicle trim element according to claim 1, wherein the decorative layer comprises leather.

15. A motor vehicle trim element, the trim element adapted to cooperate with an airbag, the trim element comprising:
a carrier layer;
a spacer layer attached to the carrier layer;
a decorative layer disposed on a side of the spacer layer facing away from the carrier layer; and
an additional layer of material disposed between the spacer layer and the decorative layer, the additional layer of material being a plastic film that is thinner than the spacer layer and the decorative layer;
wherein each of the carrier layer, the spacer layer, the additional layer of material and the decorative layer comprises a weakened area whereby at specific locations of each layer, material has been removed or displaced so as to selectively provide the weakened areas as predetermined breaking points, whereby these points where material has been removed or displaced terminate in front of the outer surface of the decorative layer and are not, therefore, visible from the outside;
wherein the weakened area in the decorative layer and the weakened area in the additional layer of material are disposed offset to one another.

16. The motor vehicle trim element according to claim 15, wherein the decorative layer includes a first weakened area, the weakened area being on a side of the decorative layer facing the spacer layer.

17. The motor vehicle trim element according to claim 16, wherein the additional layer of material includes a second weakened area.

* * * * *

UNITED STATES PATENT AND TRADEMARK OFFICE
CERTIFICATE OF CORRECTION

PATENT NO.        : 7,625,004 B2                              Page 1 of 1
APPLICATION NO.   : 11/385026
DATED             : December 1, 2009
INVENTOR(S)       : Hubert Geltinger et al.

It is certified that error appears in the above-identified patent and that said Letters Patent is hereby corrected as shown below:

Title page Item (73) Assignee should read: Lisa Dräxlmaier GmbH, Vilsbiburg (DE)

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,625,004 B2 Page 1 of 1
APPLICATION NO. : 11/385026
DATED : December 1, 2009
INVENTOR(S) : Geltinger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 271 days.

Signed and Sealed this

Twenty-sixth Day of October, 2010

David J. Kappos
*Director of the United States Patent and Trademark Office*